(12) United States Patent
Hamblin et al.

(10) Patent No.: US 8,517,438 B2
(45) Date of Patent: Aug. 27, 2013

(54) PIPE LIFTING AND HANDLING TOOL

(75) Inventors: Kevin J. Hamblin, Clearfield, UT (US); Trevor Lyndon Light, Scott Creek (AU)

(73) Assignee: Longyear TM, Inc., South Jordan, UT (US)

( * ) Notice: Subject to any disclaimer, the term of this patent is extended or adjusted under 35 U.S.C. 154(b) by 156 days.

(21) Appl. No.: 13/028,524

(22) Filed: Feb. 16, 2011

(65) Prior Publication Data

US 2011/0241366 A1 Oct. 6, 2011

Related U.S. Application Data

(60) Provisional application No. 61/319,722, filed on Mar. 31, 2010.

(51) Int. Cl.
*B65G 7/12* (2006.01)

(52) U.S. Cl.
USPC .................................. 294/15; 294/92

(58) Field of Classification Search
USPC ................ 294/15, 26, 90, 91, 92, 158, 164
See application file for complete search history.

(56) References Cited

U.S. PATENT DOCUMENTS

| 2,378,454 | A | * | 6/1945 | Werling ......................... 294/15 |
| 2,697,000 | A | * | 12/1954 | Giffin ............................. 294/15 |
| 4,632,442 | A | | 12/1986 | Gerding |
| 4,982,987 | A | * | 1/1991 | Riggins et al. .................. 294/62 |
| 5,791,704 | A | | 8/1998 | Thompson et al. |
| 6,302,410 | B1 | * | 10/2001 | Wentworth et al. ........... 279/152 |
| 2001/0050487 | A1 | | 12/2001 | Uridales, Jr. |
| 2009/0000429 | A1 | | 1/2009 | Spatig |

OTHER PUBLICATIONS

International Search Report for International Application No. PCT/US2011/026944 (mailed Nov. 28, 2011).

* cited by examiner

*Primary Examiner* — Dean Kramer
(74) *Attorney, Agent, or Firm* — Ballard Spahr LLP

(57) ABSTRACT

A handling device useful for lifting and handling pipes includes as set of jaws for grasping a surface of the pipe. An upper jaw extends along an exterior pipe surface and a lower jaw extends along an interior pipe surface. A sidewall of the pipe is positioned within a gap between the upper and lower jaws. A handle attached to the set of jaws is used to angle the jaws relative to the side of the pipe, thereby causing the upper jaw to contact the exterior pipe surface, and the lower jaw to contact the interior pipe surface. A mechanical advantage is created that selectively secures the jaws to the pipe and allows handling of the device while maintaining control of the pipe. The upper and lower jaws may be at fixed orientations relative to each other, and the handling device may have few or no moving parts.

20 Claims, 11 Drawing Sheets

PIPE LIFTING AND HANDLING TOOL

CROSS-REFERENCE TO RELATED APPLICATIONS

This application claims the benefit of, and priority to, U.S. Provisional Patent Application Ser. No. 61/319,722, filed on Mar. 31, 2010, and entitled "PIPE HANDLING TOOL," which application is expressly incorporated herein by this reference in its entirety.

BACKGROUND OF THE INVENTION

1. Field of the Invention

This application relates generally to devices, systems, assemblies, and methods for handling pipes, open-ended rods, or other components. More particularly, this application relates to handling tools for carrying a pipe using an auxiliary handling tool that allows the user to maintain a grip on the pipe while maintaining handler's hand external to the pipe.

2. Background

The process of drilling often involves handling, lifting, manipulating, and otherwise using numerous pipes or rods that may be connected together to form a drill string, drill rod, fluid conduit, borehole casing, or other passageway. To move the pipes or other components into location, they are typically handled and lifted manually, by a machine, or a combination of the foregoing. When lifted manually, a handler will typically insert his or her hand inside one of the pipes to get a hold thereon. A person at each end of the pipe may then lift and manipulate the pipe to move it into a desired location.

By inserting the handler's hand inside the opening at the end of a pipe, various types of injuries may occur. For instance, in some cases, the pipes may comprise male and/or female threads that may be connected together to form the drill string, drill rod, or other component. At a pipe opening that has internal, female threads, the handler may place his or her hand inside the pipe and against the threads. As the handler then lifts the pipe, the weight of the pipe may cause the threads to depress the surface of the hand. The threads may cause an uneven pressure over the hand that is uncomfortable and often the threads may be sharp enough to cut the skin of the hand. A user may grasp the outer surface of the pipe with a portion of his or her hand as well. If there are male threads on the outer surface of the pipe, the threads may make gripping the pipe uncomfortable. As a result, a user may attempt to merely place his or her hand inside the pipe without gripping the outer surface. Consequently, the grip may be loose, and the handler may more easily lose grip. If the handler loses his or her grip, the pipe may begin to fall, which may lead to injuries as the pipe falls and hits someone or something, or as the handler attempts to recover and catch the pipe before it hits something.

In addition to threads, the external edges, pipe end surface, and/or the interior of the pipe, regardless of whether or not there are threads near the end of the pipe, may also have edges, impurities or small burrs on the surface thereof. These elements can be sharp enough that they may cut into or otherwise injure the hand of the handler, or make grasping the pipe uncomfortable. As a result, when the handler places his or her hand on the pipe and attempts to lift and/or handle the pipe, the pipe may further injure the hand or the grip may be unstable. In still other cases, a pipe may be handled by two handlers—one on each of opposing ends. If a person on one end of the pipe loses his or her grip on the pipe, the handler on the other end may be injured by the falling pipe, or the attempts to catch the pipe. Moreover, one handler may move an end of the pipe, and can push the pipe towards the other handler. If the other handler has his or her hand inside the pipe, that handler is susceptible to having his or her hand smashed between the end of the pipe and another pipe, a vertical tube on a rack, or some other structure, particularly if movement of the pipe is unexpected.

Additionally, in some cases a pipe or other component may have been precision manufactured to satisfy very tight tolerances. Consequently, the introduction of even very small impurities into the pipe or pipe threads may have detrimental effects to the threaded connection of a pipe, the contents carried within the pipe, and the like. A handler that places his or hand inside or on the pipe may introduce impurities from the handler's hand or glove, and such impurities can be undesirable for certain applications.

To reduce the risk of injury to a handler and/or introduction of impurities, the handler may attempt to grasp only the outside surface of the pipe. In doing so, however, larger pipes may necessitate that the handler use both hands to hold and manipulate the pipe. With both hands wrapped around the pipe's exterior surface, walking with the pipe may become awkward or uncomfortable. Indeed, to increase the comfort of the handlers, a handler at one end may end up walking backwards, which may make him or her more prone to injury as he or she may be less likely to notice hazards that can cause the handler to lose or shift balance.

If a single handler is moving a pipe, the handler may grasp the interior of one end of the pipe, or use one or both hands to grasp the exterior of the pipe, and then drag the pipe to a desired location. In such a case, the single handler also risks injury to his or her hand, such as where threads or other features can cut into the handler's flesh. Moreover, by grasping the exterior surface—which is typically a smooth or polished surface—there is little friction so it may be more difficult to maintain a reliable grasp of the pipe. Additionally, dragging the pipe by grasping its exterior surface may also cause the handler to walk backwards, thereby making him or her prone to tripping on unseen objects or hazards.

Accordingly, what is desired is a pipe lifting and/or handling tool, as well as methods of use thereof. In particular, it would be useful to allow a pipe to be easily and efficiently lifted and handled while reducing risk of hand injury to the handler, and which allows the handler to move and manipulate the pipe with a single hand in a comfortable, safe, and stable manner.

SUMMARY

This present disclosure describes devices for lifting, handling, and otherwise manipulating tubular members such as pipes. The term "pipe" is used throughout the present disclosure. It will be appreciated by one skilled in the art in view of the disclosure herein that such term is intended to broadly include any number of structures. For instance, the term "pipe" is intended to include hollow structures such as pipes, casings, and rods used in the drilling industry, although the devices of the present application are not limited to use in any particular field or industry. Additionally, pipes handled using the devices herein may be made from any number of different materials, and may have numerous different sizes, lengths, cross-sectional shapes, or other features, or any combination of the foregoing.

In accordance with at least one aspect, a device for handling and/or lifting objects includes a first jaw and a second jaw. A handle is connected to one or both of the first and second jaws, and the handle can be controlled to create a mechanical advantage relative to an object placed between the first and second jaws.

In accordance with an aspect that may be combined with any one or more other aspects disclosed herein, the first and second jaws are on a device body that includes proximal and distal ends.

In accordance with an aspect that may be combined with any one or more other aspects disclosed herein, a first jaw extends distally from a proximal end of a body, and a second jaw extends distally from the proximal end of the body.

In accordance with an aspect that may be combined with any one or more other aspects disclosed herein, the first and second jaws are configured to engage opposing surfaces of an object.

In accordance with an aspect that may be combined with any one or more other aspects disclosed herein, a gap is defined between the first and second jaws, the gap extending from an opening at the distal end of a body to a termination at a proximal end of the body.

In accordance with an aspect that may be combined with any one or more other aspects disclosed herein, a gap between jaws has a size that is larger at a proximal end than at a distal end.

In accordance with an aspect that may be combined with any one or more other aspects disclosed herein, the first and second jaws are at fixed positions relative to each other.

In accordance with an aspect that may be combined with any one or more other aspects disclosed herein, a handle is at a fixed position or orientation relative to at least one of a set of jaws.

In accordance with an aspect that may be combined with any one or more other aspects disclosed herein, a second jaw has a length that exceeds the length of a first jaw and/or the second jaw extends distally further than the first jaw.

In accordance with an aspect that may be combined with any one or more other aspects disclosed herein, first and second jaws join at an intermediate member, the intermediate member being at or near the proximal end of the first and second jaws.

In accordance with an aspect that may be combined with any one or more other aspects disclosed herein, a gap between first and second jaws ends at an intermediate member.

In accordance with an aspect that may be combined with any one or more other aspects disclosed herein, first and second jaws are open at a distal end and closed at a proximal end.

In accordance with an aspect that may be combined with any one or more other aspects disclosed herein, a grip mechanism is positioned at about a distal end of one of the first or second jaws.

In accordance with an aspect that may be combined with any one or more other aspects disclosed herein, a grip mechanism includes a carbide grip element.

In accordance with an aspect that may be combined with any one or more other aspects disclosed herein, first and second jaws are about parallel.

In accordance with an aspect that may be combined with any one or more other aspects disclosed herein, first and second jaws are inclined relative to each other.

In accordance with an aspect that may be combined with any one or more other aspects disclosed herein, first and second jaws are inclined between about 3 and about 10 degrees relative to each other.

In accordance with an aspect that may be combined with any one or more other aspects disclosed herein, a first jaw is an upper jaw and a second jaw is a lower jaw.

In accordance with an aspect that may be combined with any one or more other aspects disclosed herein, one or more of first and second jaws are elongated.

In accordance with an aspect that may be combined with any one or more other aspects disclosed herein, a handle has a loop configuration.

In accordance with an aspect that may be combined with any one or more other aspects disclosed herein, a handle is coupled to any one or more of a first jaw, second jaw, or intermediate member between the first and second jaws.

In accordance with an aspect that may be combined with any one or more other aspects disclosed herein, any one or more of a first jaw, second jaw, intermediate member, or handle are formed as separate components and thereafter joined together.

In accordance with an aspect that may be combined with any one or more other aspects disclosed herein, any one or more of a first jaw, second jaw, intermediate member, or handle are formed as a single, integral component.

In accordance with an aspect that may be combined with any one or more other aspects disclosed herein, a gap between first and second jaws is smaller toward an open distal end than at a closed proximal end.

In accordance with an aspect that may be combined with any one or more other aspects disclosed herein, contact points are on first and second jaws, the contact points being on respective internal surfaces of the jaws, and the contact points being proximate distal ends of the jaws. The contact points are configured to contact a structure positioned between two jaws.

In accordance with an aspect that may be combined with any one or more other aspects disclosed herein, a contact point on a first jaw is further from a proximal end than a contact point on a second jaw.

In accordance with an aspect that may be combined with any one or more other aspects disclosed herein, a method for lifting and/or handling a tubular member includes connecting a handling device to a tubular member. A first jaw can be inserted into a lumen of the tubular member and can slide longitudinally within the lumen. A second jaw may slide longitudinally relative to an exterior surface of the tubular member. A proximal end of the handling device may be lifted, which can cause the second jaw to engage an exterior surface of the tubular member at a first contact point. The first jaw is caused to contact an interior surface of the tubular member at a second contact point. The first contact point is distally offset relative to the second contact point.

In accordance with an aspect that may be combined with any one or more other aspects disclosed herein, a handling device is manipulated using a handle connected to a first or second jaw, such that contact points remain in substantially constant engagement with a tubular member and at a substantially fixed location of the tubular member.

In accordance with an aspect that may be combined with any one or more other aspects disclosed herein, lifting a proximal end of a handling device creates a mechanical advantage between first and second jaws of the handing device and a tubular member therebetween.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, it is contemplated that each feature identified in this Summary may be independently included with any other one or more features identified herein, unless such feature is expressly described as requiring use with one or more particular other features, or by its nature cannot be used in combination with other features herein.

Additional features and advantages will be set forth in the description which follows, and in part will be obvious from the description, or may be learned by the practice of the teachings herein. Features and advantages of the present disclosure may be realized and obtained by means of the instruments and combinations particularly pointed out in the appended claims. Features of the present disclosure will become more fully apparent from the following description and appended claims, or may be learned by the practice of the disclosed embodiments as set forth hereinafter.

BRIEF DESCRIPTION OF THE DRAWINGS

To further clarify the aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Together with the following description, the figures demonstrate the features of the devices, assemblies, systems and associated methods of using, handling, and lifting pipes and other tubular or hollow members. The provided drawings are to scale for example embodiments; however, the provided scale should not be limiting as the handling tools may be used with a number of different sizes of pipes or other tubular members, and may be modified in any suitable manner that allows the practice of the invention described herein. Thus, the dimensions depicted are not intended to limit the scope of the device with regard to length, diameter, relative dimensions, or the like.

DETAILED DESCRIPTION OF SOME EXAMPLE EMBODIMENTS

The following description supplies specific details in order to provide a thorough understanding. Nevertheless, the skilled artisan would understand that the apparatus, assemblies, systems, and methods described herein can be implemented and used without employing theses specific details. Indeed, the apparatus, assemblies, and systems can be placed into practice by modifying the apparatus and associated method and can be used in conjunction with any apparatus, systems, components, and/or techniques conventionally used in the industry. For example, while the description herein focuses on using described lifting and handling tools with drill rods or other pipes, such tools could be adapted to be used with substantially any type of tubular member, structure with an end that is at least partially open, or even on other structures. Thus, the description of "pipes" or "tubular members" as used herein is merely exemplary and not intended to limit the scope of the present invention unless otherwise expressly claimed.

Devices for lifting and/or handling pipes and other members as disclosed herein may include a set of jaws that may be placed in contact with an interior and exterior surface of a pipe or other tubular member, and to create a mechanical advantage that allows an handler to manipulate the lifting device and lift and/or move a tubular member while the handler's hand remains outside of the tubular member. In some embodiments, a set of jaws may include an upper jaw and a lower jaw of differing lengths. In other embodiments, however, additional or other arrangements are contemplated. For instance, two jaws may have approximately the same length.

Additionally, in at least some embodiments, the jaws may be at a fixed position relative to each other; however, in other embodiments the jaws may be capable of some relative motion. For example, one jaw may have a pivot connection to a second jaw, or to a spacing member connecting the separate jaws. The first jaw may then be rotated relative to the second jaw, and optionally locked into place. Of course, one skilled in the art that other types of permanent or temporary connections may be used for a set of two or more jaws.

Figure 1:
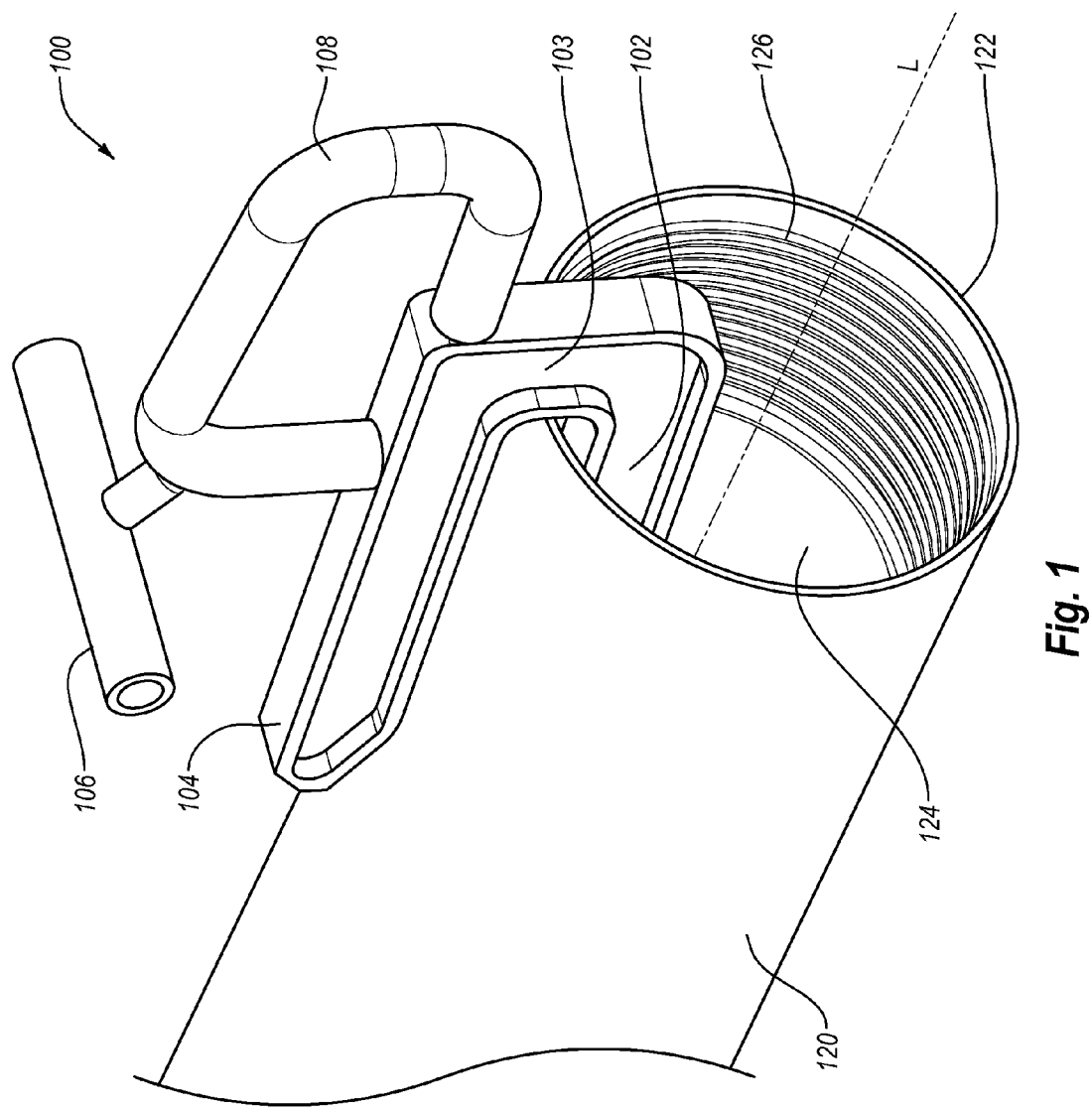
FIG. 1 shows an example of a handling and lifting device used in connection with a pipe.
Figure 2:
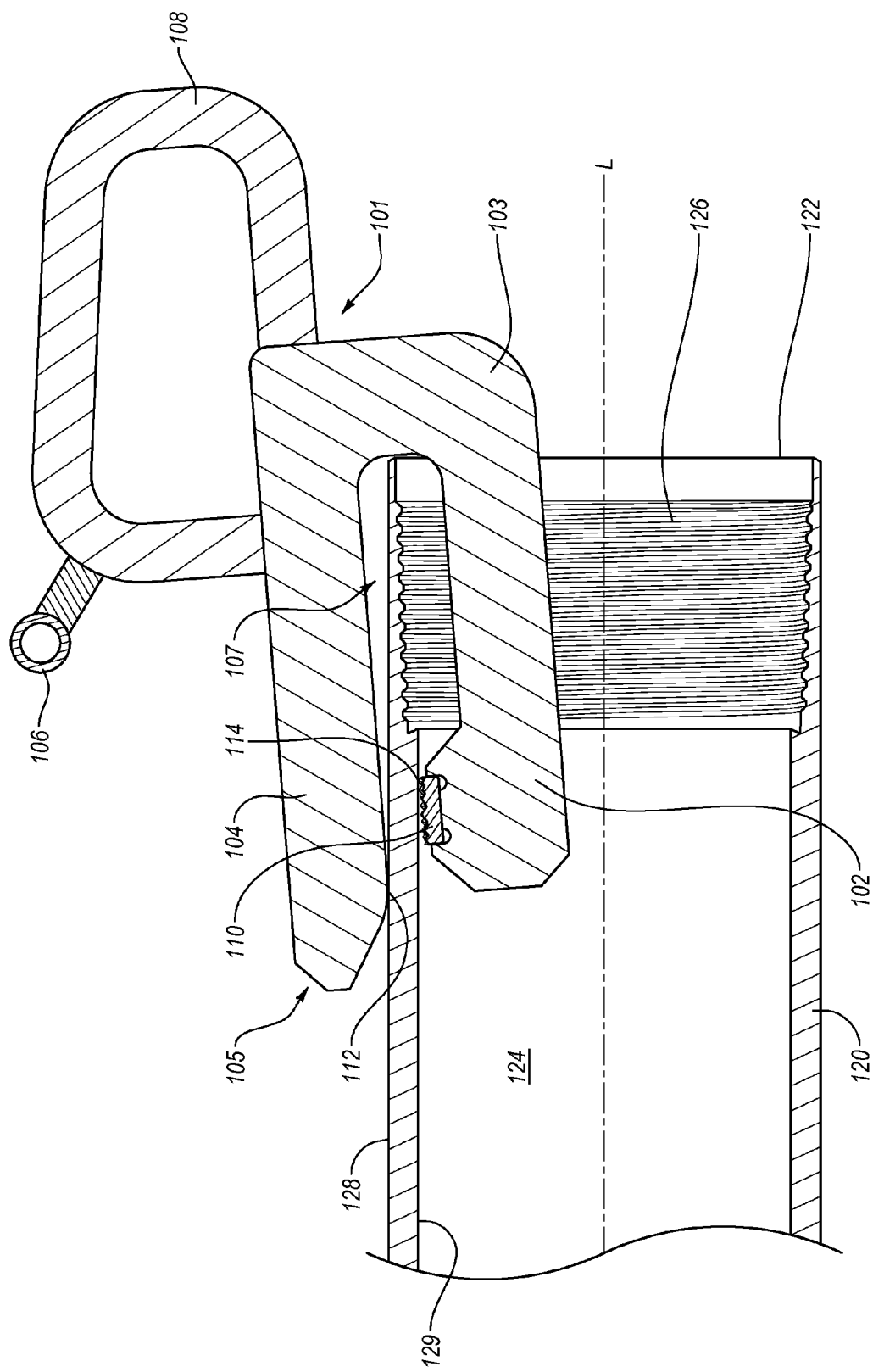
FIG. 2 illustrates a cross-sectional view of the handling and lifting device of FIG. 1.

One example of a lifting and/or handling device 100 is illustrated in FIGS. 1 and 2. In the illustrated embodiment, the exemplary lifting device 100 includes a set of jaws 102, 104. In this example, the jaws 102, 104 are spaced apart from each other. For example, the jaws 102, 104 may, extend from an intermediate member 103. In particular, and as best shown in FIG. 2, an intermediate member 103 may be positioned at a proximal end 101 of the device 100. Ends of the jaws 102, 104 at the proximal end 101 of the device 100 may be connected to the intermediate member 103, such that the jaws 102, 104 extend in a generally cantilevered fashion from the intermediate member 103. In the example illustrated in FIGS. 1 and 2, the jaws 102, 104 extend from the intermediate member 103 towards the distal end 105 of the lifting and/or handling device 100, and may be generally parallel to each other, although the particular configuration in FIGS. 1 and 2 is merely exemplary.

In some embodiments, the intermediate member 103 may have a length, width, height, or other dimension that facilitates an offset between a first jaw 102 and a second jaw 104. For instance, in FIGS. 1 and 2, the jaws 102, 104 may be fixed to the intermediate member 103 at opposing ends thereof. The length of the intermediate member 103 may also be larger than the combined width of the first and second jaws 102, 104. As a result, an opening may be formed between the jaws 102, 104. The opening between the jaws 102, 104 may be the result of the intermediate member 103 spacing apart the jaws 102, 104 in order to create a gap 107 between the jaws 102, 104 at the distal end 105 of the device 100. As shown in FIGS. 1 and 2, in such an embodiment, a pipe 120 or other structure may be inserted at least partially through an open end of the gap 107, and at the distal end 105 of the device 100. The pipe 120 may extend through the gap, in a longitudinal direction, to a termination of the gap 107 at or near the intermediate member 103. The pipe 120 can also engage or otherwise contact the jaws 102, 104. The handling and/or lifting device 100 may then be used to handle, lift, or otherwise manipulate the pipe 120, as described herein. In some embodiments, the intermediate member 103 may also be referred to as a spacer member inasmuch as it may facilitate providing the space or gap 107 between the jaws 102, 104.

In the context of the illustrated embodiments of FIGS. 1 and 2, the jaws 102, 104 may also be described using relative terms. For instance, the first jaw 102 may be referred to as a lower jaw or interior jaw, while the second jaw 104 may be referred to as an upper jaw or outer jaw. It should be appreciated that such terms are for differentiation purposes only, and these relative terms are not meant to limit the present disclosure. For instance, in some embodiments, the upper jaw 104 may be positioned at a location that is lower or at an even elevation relative to a position of the lower jaw 102. Moreover, depending on a structure of the component being handled using the device 100, it may be possible to also place the second jaw 104 at least partially interior to a structure, while the first jaw 102 may be at least partially exterior to the carried structure. Further, the terms "first" and "second" in relation to the jaws are used merely to indicate that multiple different jaws may be present, but such terms need not specifically refer to an upper, lower, or other jaw. For instance, the upper jaw 104 may also be referred to as a first jaw while the lower jaw 102 may be referred to as a second jaw.

With continued reference to FIGS. 1 and 2, the handling and/or lifting device 100 may be at least temporarily coupled to the pipe 120 in a manner that allows the handler, operator, or other user to manipulate pipe 120. For instance, a handler may grasp the device 100 using a handle 106 and/or handle 108. In this example embodiment, the handling and/or lifting device 100 allows manipulation of the pipe 120 as it couples to both an exterior surface 128 and an interior surface 129 of the pipe 120. More particularly, the upper jaw 104 may contact the exterior surface 128 of pipe 120 at a first contact point 112, while the lower jaw 102 may contact the interior surface 129 of the pipe 120 at a second contact point 114. Thus, according to one embodiment, the pipe lifting and/or handling device 100 facilitates handling, lifting, or other manipulation of the pipe 120 through a connection that makes use of at least two contact points 112, 114 on the pipe 120. As noted previously, the contact points 112, 114 may be on opposing surfaces of the pipe 120. Moreover, although such contact is described as being at particular points, the contact may actually exist along a line or surface. Thus, a "contact point" should be broadly construed as a location of contact, and not limited to a discrete point or particular area of contact.

More particularly, the handling and/or lifting device 100 may be selectively and/or removably coupled to the pipe 120 in any suitable manner. In the illustrated embodiment, it can be seen that at least a portion of the lower jaw 102 at the distal end 105 of the handling and/or lifting device 100 is positioned within an interior lumen 124 of the pipe 120; however, all or substantially all of the jaw 102 may be within the interior of the pipe 120. In contrast, in FIGS. 1 and 2, the upper jaw 104 and intermediate member 103 may be generally exterior to the pipe 120. In this exemplary embodiment, the handling and/or lifting device 100 is removably secured to the pipe 120 and can be used to lift and otherwise handle the pipe 120.

The particular principles on which the handling and/or lifting device 100 may selectively couple or grasp the pipe 120 for lifting and/or handling may be varied by one skilled in the art upon a review of the description herein. In this example embodiment, however, the handling and/or lifting device 100 operates, at least in part, by creating a mechanical advantage. More particularly, a mechanical advantage may be created by coupling the handling and/or lifting device 100 to the pipe 120 in such a way that provides sufficient frictional forces to eliminate or reduce slippage between the handling and/or lifting device 100 and the pipe 120. As a result, an operator may manipulate the handling and/or lifting device 100, which in turn may manipulate the pipe 120, while the operator need not actually grasp the pipe 120. For example, in this embodiment, the mechanical advantage may be facilitated by the jaws 102, 104 which can extend from the intermediate member 103 in a generally parallel direction, but which are angled relative to a longitudinal axis L of the pipe 120.

By inclining one or both of the jaws 102, 104 relative to the pipe 120, the upper jaw 104 may be caused to contact the pipe 120 at the contact point 112 on the exterior surface 128 of the pipe 120, while the lower jaw 102 also contacts the pipe 120 at the contact point 114 on the interior surface 129 of the pipe 120. Such contact may be at discrete points, along lines, or along surfaces, and in some cases, may be at a substantially single location on the respective exterior and interior surfaces 128, 129.

As best illustrated in FIG. 2, the contact points 112, 114 may be longitudinally offset relative to each other in some embodiments. For instance, in the illustrated embodiment, the contact point 112 is at a location that is more distally removed from a face 122 of the pipe 120 when compared to the contact point 114. Through such an axial separation of the contact points 112, 114, a desired mechanical advantage may be obtained, which mechanical advantage allows the jaws 102, 104 to collectively and securely grasp the pipe 120 to allow lifting and/or handling of the pipe 120 without slippage, or with reduced slippage relative to a device merely inserted into the pipe 120.

To facilitate leveraging of a mechanical advantage in handling, lifting, or otherwise manipulating the pipe 120, the jaws 102, 104 may have any of a number of suitable shapes, sizes, and constructions. In the illustrated embodiment, for instance, the upper jaw 104 has a length that is greater than a length of the lower jaw 102. Although not necessary, the lengths of the jaws 102, 104 may facilitate locating of the contact point 112 between the upper jaw 104 and the pipe 120 in a location that is distal to, or at about the a same distal position, when compared to the distal end of the lower jaw 102. With such a size and/or configuration, the rotation of the handling and/or lifting device 100 in a manner that inclines the device 100 relative to the pipe 120 allows the two contact points 112, 114 to be created and leveraged to cause the device 100 to grip the pipe 120. It should also be appreciated in view of the disclosure herein that the relative positions of the contact points 112, 114 may vary based on a number of factors. For instance, depending on the thickness of the pipe 120, the position of the contact points 112, 114 may vary relative to each other.

Although not necessary, the handling and/or lifting device 100 may include one or more additional mechanisms or means for gripping the pipe 120. For instance, in the illustrated embodiment, a grip insert 110 may be inserted within, integral with, coupled to, or otherwise disposed on, the lower jaw 102. In such an example, the second contact point 114 may exist between the interior surface 129 of the pipe 120 and the grip insert 110. The grip insert 110 may be configured for frictional contact with the pipe 120, with such frictional contact optionally being more resistant to relative movement than the frictional grip of the jaw 102 alone. For example, the grip insert 110 may be formed of a carbide material that compresses against the interior surface 129 and resists relative movement between the pipe 120 and the lower jaw 102. Of course, other materials may also be used and/or the grip insert 110 may be positioned at other or additional locations. For instance, the grip insert 110 may be positioned within or on the upper jaw 104, or on both jaws 102, 104. The grip insert 110 may also be replaced by a coating on at least a portion of the lower and/or upper jaws 102, 104. In still other embodiments, the grip insert 110 is formed of materials other than carbide. For instance, the grip insert 110 may be formed of any suitable metal, alloy, polymer, composite, organic, or other material, or any combination of the foregoing, that can enhance creation of a frictional grip with the pipe 120. Thus, the grip insert 110 may have a rough surface to increase friction, may have an adherence or magnetic property relative to the pipe 120, or may be otherwise configured.

As noted previously, one manner in which the handling and/or lifting device 100 may be used is to rotate handling and/or lifting device 100 relative to pipe 120 so as to facilitate contact between the device 100 and the pipe 120 at two or more contact points 112, 114. As also previously noted, the contact points 112, 114 are optionally offset longitudinally from each other along the longitudinal axis of the pipe 120, which offset may facilitate leveraging creation of a mechanical advantage that allows secure lifting and handling of the pipe 120. Based on the wall thickness of the pipe 120, the gap 107 between the contact surfaces of the lower and upper jaws 102, 104, and other considerations, one skilled in the art will appreciate in view of the disclosure herein that the degree of inclination between the pipe handling device 100 and the pipe 120 may be varied. Accordingly, the illustrated embodiment is not necessarily to scale for all embodiments. In some cases, the angle between the longitudinal axis of the pipe 120 and the longitudinal axes of the jaws 102, 104 may be between about 5 and about 100 degrees. In other embodiments, however, the angle may be greater or lesser. For instance, in other embodiments, the angle may be between about 2 and about 110 degrees. In some embodiments, a degree of inclination of one or both of the jaws 102, 104 relative to the pipe 120 is between about ten and about thirty degrees.

As the degree of inclination of the device 100 relative to the pipe 120 changes, the position of different portions of the pipe 120 may also change in different magnitudes. More particularly, as shown in FIG. 2, the size of a gap 107 between the lower and upper jaws 102, 104 may change along the length of the device 100. In some embodiments, the size of the gap 107 is larger near the proximate end 101 of the handling and/or lifting device 100. Such increase in the size of the gap 107 may allow, for instance, greater inclination of the pipe 120 relative to the device 100. More particularly, as the angle or incline of the device 110 relative to the pipe 120 increases, the interior surface 129 at the face 122 of the pipe 120 may approach contact with the jaw 102 at least proximate the proximal end 101 of the device 100. If the gap 107 is small, the interior surface 129 near the face 122 may engage the lower jaw 102 and prevent additional inclination of the device 100. However, by expanding the size of the gap 107, the amount of inclination can be increased, thereby allowing the handling and/or lifting device 100 to be usable with a greater variety of sizes or configurations of pipes. One or both of the jaws 102, 104 may also include angled, beveled, chamfered, or otherwise contoured surfaces at or near the distal end 105 of the handling and/or lifting device 100. For instance, angled edges extending away from the gap 107 may facilitate creation of a contact point, increased angling or inclination of the device 100 relative to a pipe 120, or may provide guide surfaces that facilitate insertion of the pipe 120 into the gap 107.

As also illustrated in FIGS. 1 and 2, the pipe 120 may have threading 126 at or near and end of the pipe 120. In the illustrated embodiment, the threading 126 is formed on the interior surface 129 of the pipe 120, thus allowing the illustrated end of the pipe 120 to act as a female connector which may mate with a male connector that has corresponding threading on an exterior surface thereof. It should be appreciated in view of the disclosure herein, however, that the threading 126 may alternatively or additionally be on the exterior surface 128 of the pipe 120. Moreover, while the illustrated threading 126 is shown as being tapered, such that a width of the threading 126 is larger nearer the face 122 of the pipe 120, such threading 126 is merely exemplary. The threads 126 may be generally straight. Moreover, the threading 126 may have any of a variety of different configurations in terms of pitch, thread form shape, number of thread starts, helix angle, lead angle, and the like.

Another aspect of the handling and/or lifting device 100 is that it may connect to the pipe 100 and facilitate handling thereof, without a reduced likelihood of causing damage to the threading 126 on the pipe 120. For instance, in the illustrated embodiment, the jaws 102, 104 have a generally elongated construction, and each extends distally into the pipe 120. The distal ends of the jaws 102, 104 may, in some embodiments, be more distal relative to the face 122 of the pipe 120 than a termination of the threading 126. As a result, the contact points 112, 114 optionally may be at positions that are out of alignment with the threading 126. In other words, one or both of the contact points 112, 114 may be at a distal position in which the contact points 112, 114 engage the pipe 120 without engaging the threading 126. Consequently, the jaws 102, 104 may avoid contact with the threading 126, and thus reduce a risk of damaging the threading 126. A risk of damage or contamination can thus occur, and the pipe 120 may be connected to another pipe, a coupling, or other structure by using threading 126, with a reduced risk that the threading 126 will improperly mate with the adjoining structure, or that a seal will leak in an undesirable manner.

To further facilitate lifting, handling, and other manipulation of the pipe 120, the handling and/or lifting device 100 may include one or more handles 106, 108. The handles 106, 108 can particularly provide one or more portions that may be easily grasped by the operator. In the illustrated embodiment, for instance, a loop handle 108 connects to the upper jaw 102 and to the intermediate spacer member 103. Such a connection may provide a looped configuration and allow an operator to grasp the device 100 while inserting and/or connecting the handling and/or lifting device 100 to the pipe 120, while inclining the device 100 relative to the pipe 120 following insertion of the pipe 120 into the device 100, or at any other time. By grasping the loop handle 108, the operator can optionally maintain his or her hand fully exterior to the pipe 120, thereby also reducing the risk of injury to the user's hand.

Optionally, a second handle 106 may also be formed on the handling and/or lifting device 100. For instance, the second handle 106 may have a T-shaped configuration as best shown in FIG. 1. As with loop handle 108, T-shaped handle 106 may also allow a user to handle and otherwise manipulate the pipe 120. More particularly, by grasping the T-shaped 106, the operator can create or maintain a mechanical advantage between the pipe 120 and the jaws 102, 104, and thereby facilitate lifting and/or handling of the pipe 120. As shown in FIG. 2 the loop handle 108 may generally be positioned toward the proximal end 101 of the handling and/or lifting device 100, and one or both of the handles 106, 108 can further be proximally located relative to the contact points 112, 114. Such positioning allows an operator to lift upward on one or both of the handles 106, 108 and thereby rotate or incline the jaws 102, 104 relative to the pipe 120, and such that the angle between the jaws 102, 104 and the pipe 120 is created, increased, and/or maintained, thereby also maintaining the mechanical advantage used to securely grip the pipe 120.

The handles 106, 108 may be connected together as shown in FIGS. 1 and 2. For instance, loop handle 108 of the illustrated embodiment connects at opposing ends to the upper jaw 104 and to the intermediate member 103, although in other embodiments the loop handle 108 may be otherwise configured. Further, the T-shaped handle 106 may be connected to, or extend from the loop handle 108. In the illustrated embodiment, for instance, the T-shaped handle 106 is cantilevered off a portion of the loop handle 108. In other embodiments, however, a T-shaped handle 106 may be otherwise positioned, or may even be eliminated. For instance, the handling and/or lifting device 100 may have only a single one of the handles 106, 108, or may have any other type of handle.

Figure 3A:
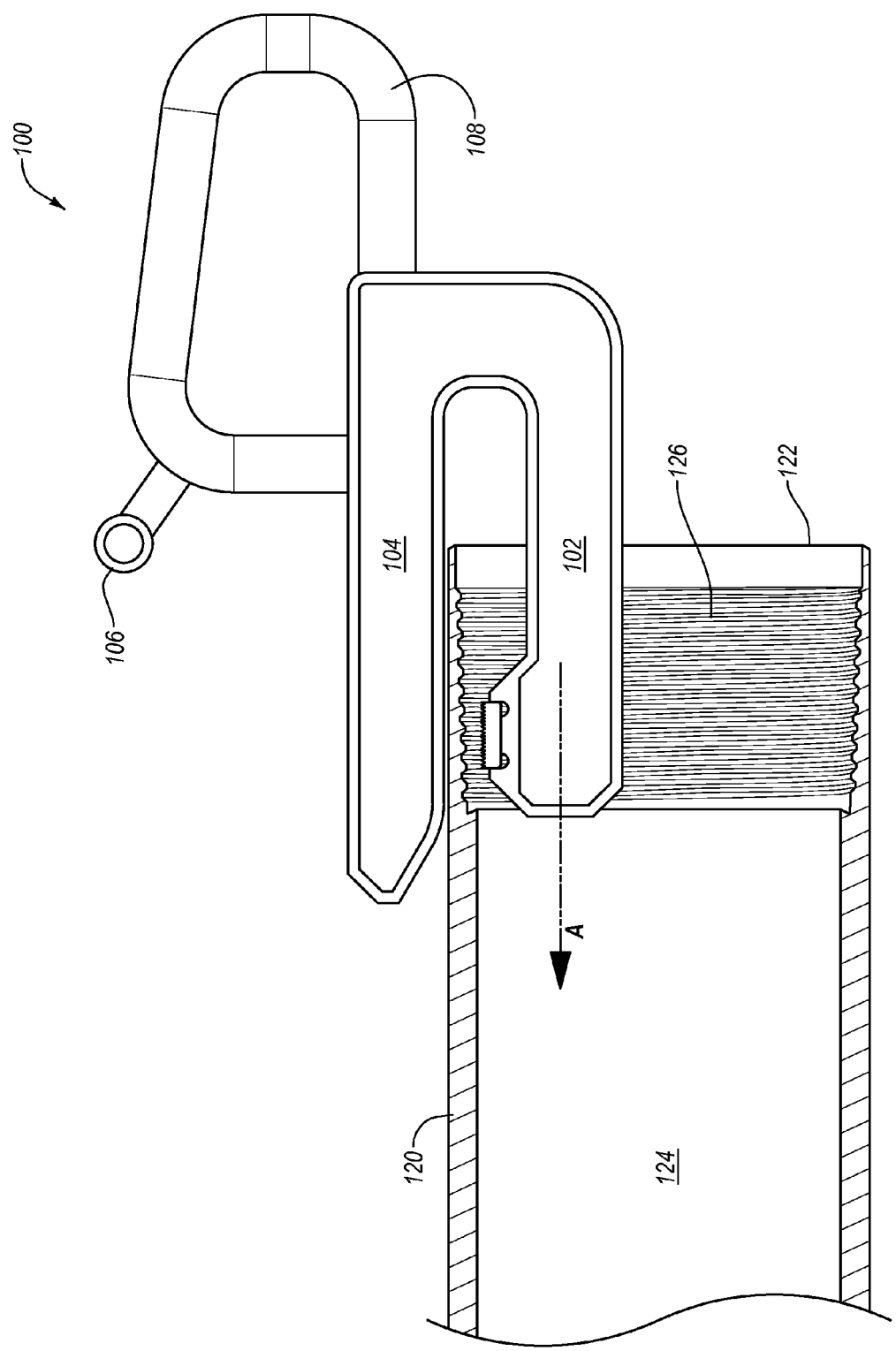
FIGS. 3A-3C illustrate a partial cut-away perspective view of a pipe and handling and lifting device, and illustrate an example method of use of the handling and lifting device.
Figure 3B:
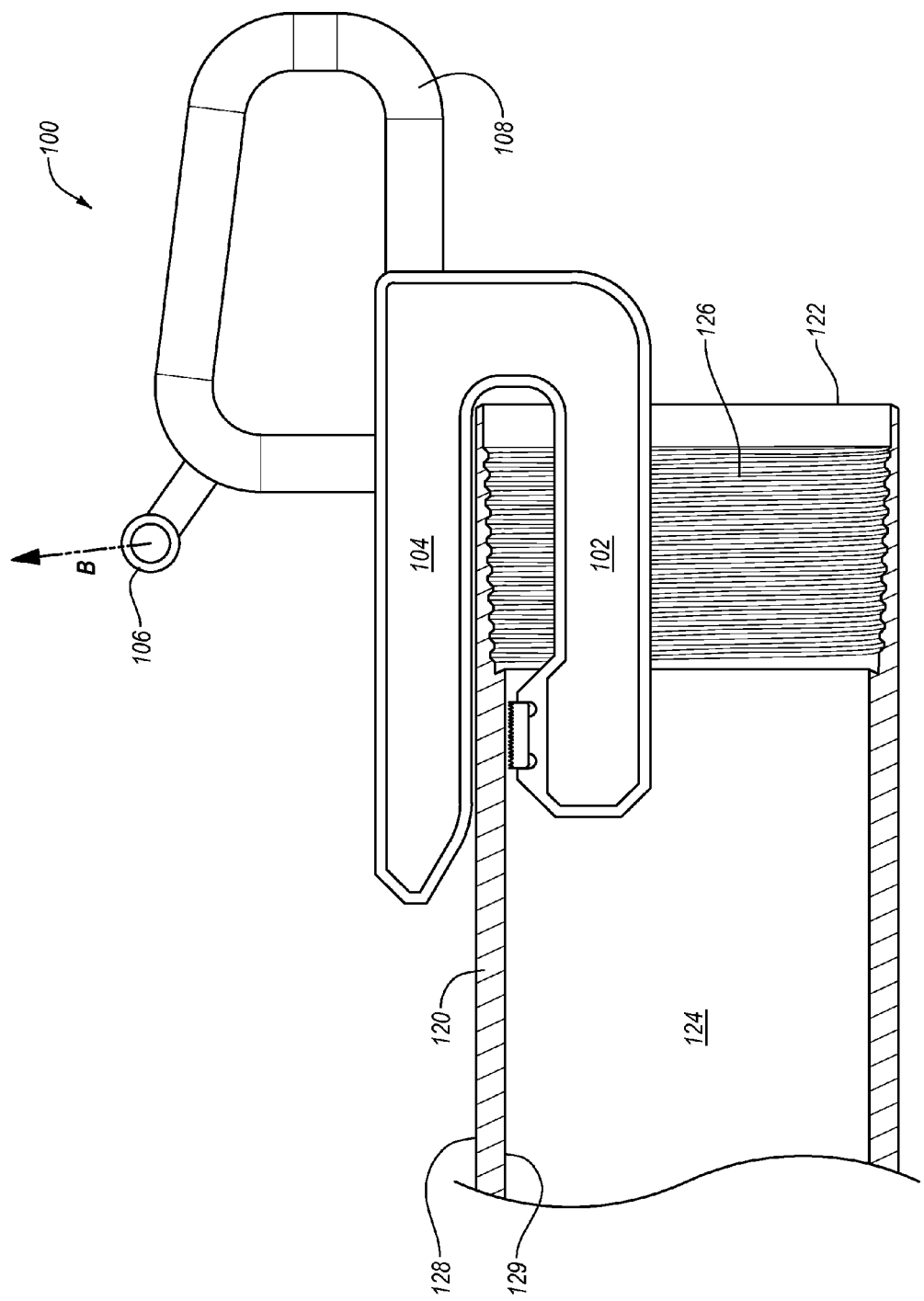
Figure 3C:
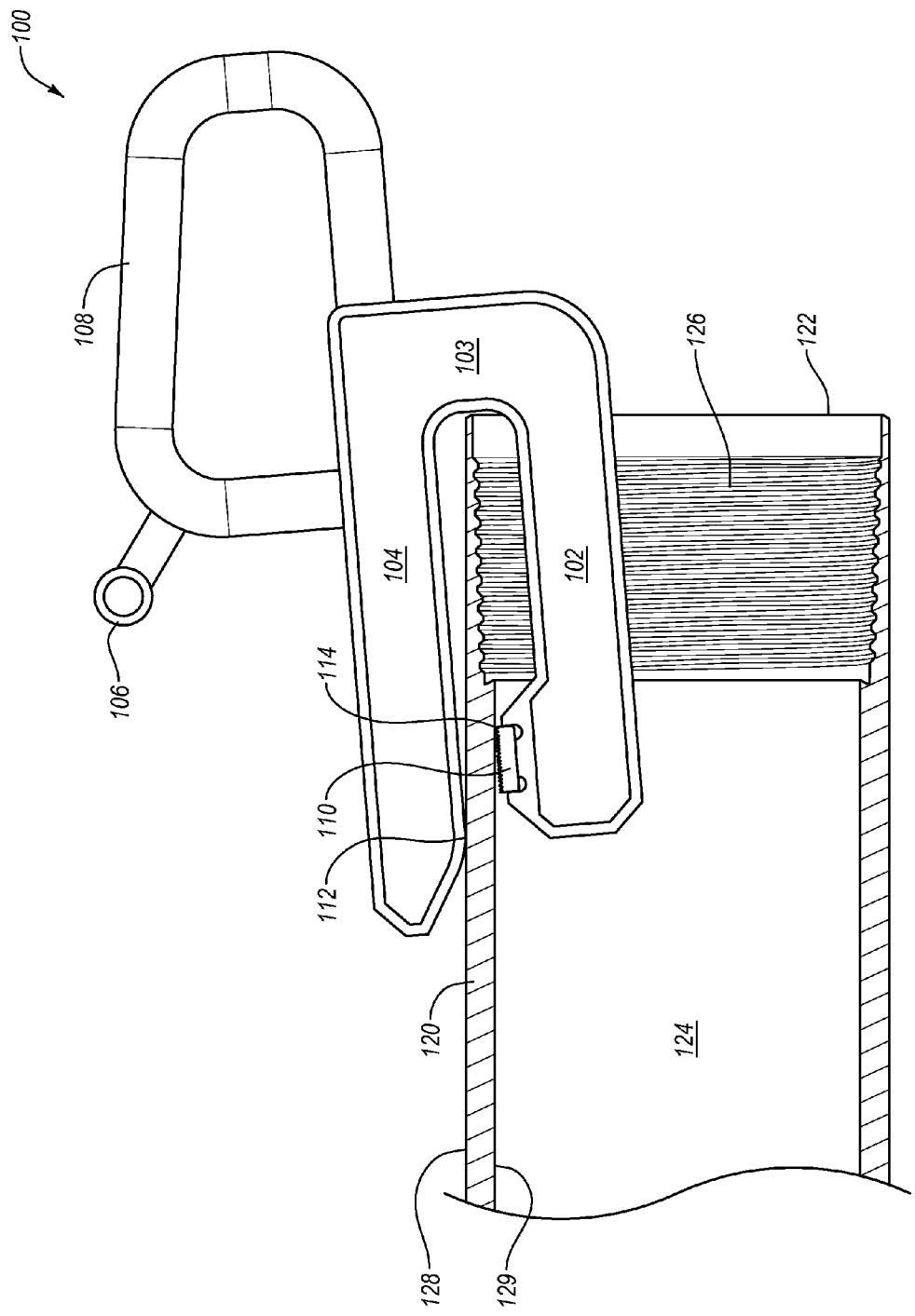

A more particular description of an example method of coupling the handling and/or lifting device 100 to the pipe 120 is provided in FIGS. 3A-3C. In FIG. 3A, for instance, the handling and/or lifting device 100 is in the process of being inserted within the lumen 124 of pipe 120. More particularly, the lower jaw 102 may be inserted though an opening in the pipe 120, which opening may begin at the face 122 of the pipe 120. Following insertion of the device 100 into the pipe 120, the lower jaw 102 may be moved distally in the direction of arrow A. Such insertion and/or movement may be facilitated or performed by an operator who grasps onto handle 108 and/or handle 106. By then moving the operator's arm, the operator can collectively move the jaws 102, 104 in the direction of arrow A. As will also be appreciated in view of the disclosure herein, one or both of the jaws 102, 104 may be generally parallel to pipe 120 while the lower jaw 102 is being inserted into the lumen 124 of the pipe 120. As a result, the lower jaw 102 can optionally be inserted without engaging or contacting the threading 126. In some cases, the upper jaw 104 may slide relative to and/or along the exterior surface of the pipe 126, although this need not be the case. In other embodiments, for instance, threading may be on the exterior surface of the pipe 120, the pipe 120 may have a surface treatment that could be damaged, there may be no internal threading 126, or the internal threading 126 may not be prone to damage. Accordingly, in such embodiments, the lower jaw 102 may engage or slide along the interior surface and/or threading 126 of the pipe 120.

As best illustrated in FIG. 3B, the handling and lifting device 100 may be at least partially slid into the pipe 120 until the jaws 102, 104 are positioned at locations that are distal relative to threads 126, or are otherwise at a desired location. For instance, a depth indicator may optionally be placed on one or more of the jaws 102, 104 to provide graphical indicia for aligning the end 122 of the pipe 120 with the handling and/or lifting device 100, although this need not be the case. The length of the jaws 102, 104 may be such that they easily extend past threads 126 when the pipe 120 engages against, or nearly engages, the intermediate member 103.

When the jaws 102, 104 are fully within and/or on the pipe 120, or are otherwise located at a desired position relative to the pipe 120, the operator may grasp or manipulate one or both of the handle 106, 108 in a desired manner. For instance, by pulling on the handles 106, 108 in a generally upward such as that illustrated by the arrow B, the operator may create a mechanical advantage such as that described herein. More particularly, contact between the pipe 120 and the handling and/or lifting device 100 may be created in a manner that leverages the pipe 120 between two contact points 112, 114 (FIG. 3C) on opposing sides of a wall of the pipe 120. Such leverage may be used to selectively and removably secure the jaws 102, 104 to the pipe 120. For instance, as shown in FIG. 3B, the handles 106, 108 may be at a proximal location of the handling and/or lifting device 100. Consequently, by lifting the handles 106, 108, the proximal end of the device 100 can rotate and move upward relative to the pipe 120. Such a rotation may also cause the distal end of the upper jaw 104 to move generally downward and the proximal end of the lower jaw 102 to move generally upward. The result of such movement is illustrated in FIG. 3C, in which the upper jaw 104 is caused to contact the outer surface 128 of the pipe 120 at the first contact point 112, while the lower jaw 102 is caused to contact the inner surface 129 of the pipe 120 at the second contact point 114.

When the pipe handling device 100 is coupled to the pipe 120 in the described or another suitable manner, an operator may be enabled to use one or more of the handles 106, 108 to manipulate the pipe 120. For instance, by maintaining an upward force on the handles 106, 108, the operator may lift the pipe 120. Moreover, the weight of the pipe 120 may assist in maintaining a secure connection as the pipe 120 can be pulled down, and against the device 100 such that the contact points 112, 114 are held in place. Such securement may allow the operator to using the handles 106, 108 and move, rotate, or even shake the pipe 120, while maintaining a grip on the pipe 120. When the pipe 120 is in a desired position—such as being positioned adjacent a connecting pipe—a user may simply rotate the handles 106, 108 in an opposite direction, thereby releasing the mechanical advantage. The same approach may be obtained by placing the pipe 120 on the ground or other surface, and then releasing the handles 106, 108. The handling and/or lifting device 102 may then be removed from the pipe 120.

The previously described handling and/or lifting device 120 may be formed in any suitable manner, and may be made from any number of different materials. For instance, the jaws 102, 104 and/or the intermediate member 103 are optionally formed as a single body of the device 100, and from a single, integral piece of material. Such a material may be a metal, alloy, polymer, composite, organic, or other material, or any combination of the foregoing. For instance, a metal or alloy may be formed in a shape generally corresponding to the illustrated C-shape of the jaws 102, 104 and the intermediate member 103 by a forming, machining, casting, or other suitable process; however, any other suitable shape of the jaws 102, 104 and/or intermediate member 103 may be formed in a similar or other manner. The grip insert 110 may also be formed in any suitable manner. For instance, the grip insert 110 can be molded or otherwise formed in a same process during which the jaws 102, 104 and/or the intermediate member 103 are shaped or otherwise formed. In another embodiment, the grip insert 110 can be formed separately and adhered to the upper or lower jaw 102, 104 using a welding, brazing, thermal bonding, or other technique, or using an adhesive, mechanical fastener, or other fastening method.

The illustrated handles 106, 108 may also be connected to the jaws 102, 104 and/or the intermediate member 103. For instance, in some embodiments, the loop handle 108 may be formed from a different material, or a different piece of material as compared to the jaws 102, 104. For instance, the jaws 102, 104 may have an I-shaped or T-shaped cross-sectional shape, while the loop handle 108 has a circular, elliptical, or other cross-sectional shape. Separate materials may be, but are not necessarily, used to form the loop handle 108. The loop handle 108 may, however, be molded, bent, machined, cast, or otherwise formed or shaped and attached to the jaws 102, 104 and/or the intermediate member 103. For instance, the loop handle 108 may be welded, brazed, thermally bonded, or otherwise secured to the body that includes the jaws 102, 104 and the intermediate member 103. The T-shaped handle 106 may also be formed with the loop handle 108 and/or the jaws 102, 104, or separate therefrom. For instance, the handle 106 can be formed from tubes or rods and then welded or otherwise bonded to the loop handle 108 and/or the upper jaw 104.

Accordingly, the handling and/or lifting device 100 of FIGS. 1-3C can be manufactured or made in any number of different manners, including by attaching separate components into a single device. In other embodiments, the device 100 may be integrally formed such that attaching of various components is unnecessary or limited. For instance, FIGS. 4A-4H illustrate various views of another example embodiment of a handling and/or lifting device 200 according to still another example embodiment of the present disclosure.

The handling and/or lifting device 200 may be used in a manner similar to that described above with respect to the handling and/or lifting device 100 (FIG. 1). Accordingly, an additional, specific description of all such aspects of the handling and/or lifting device 200 will not be provided hereafter, and a description of such features may be obtained by referencing the above description. The handling and/or lifting device 200 may thus also be used in a manner that creates a mechanical advantage on a pipe or other member, and allows the handling and/or lifting device 200 to be used to easily and safely handle or lift the pipe.

Figure 4A:
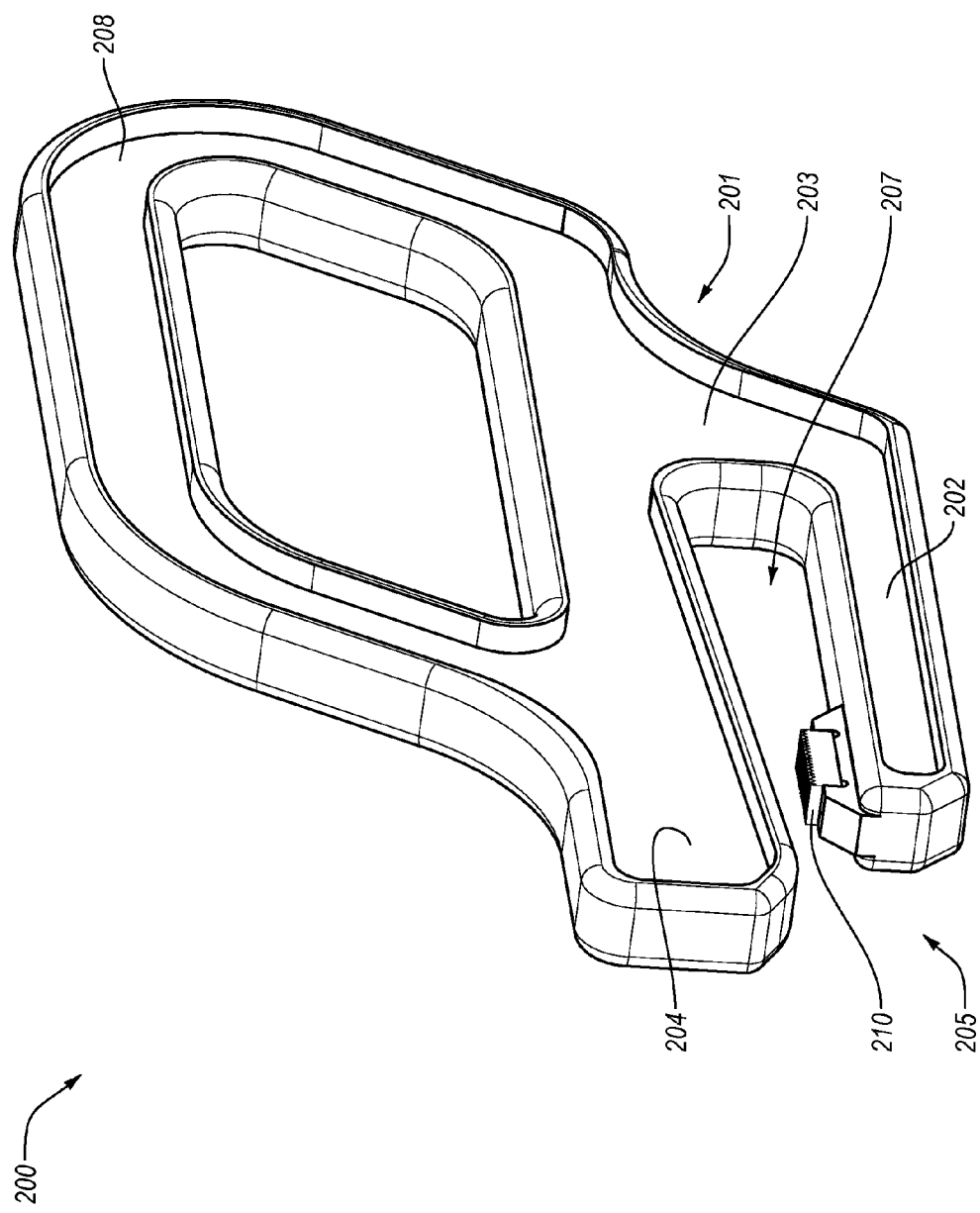
FIG. 4A illustrates a perspective view of another embodiment of a handling and lifting device used in connection with a pipe.
Figure 4B:
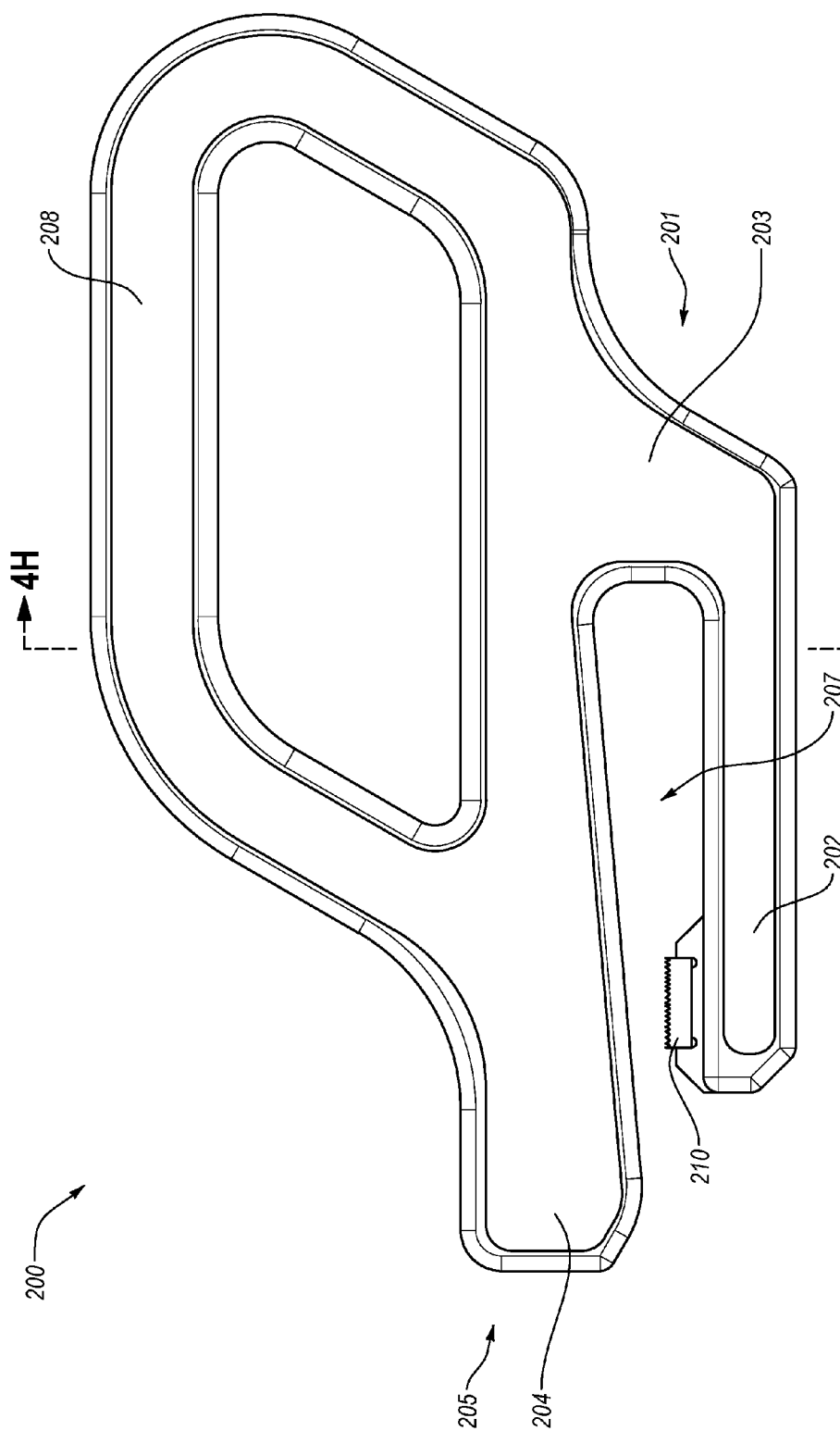
FIGS. 4B-4G illustrate side views of the handling and lifting device of FIG. 4A.
Figure 4C:
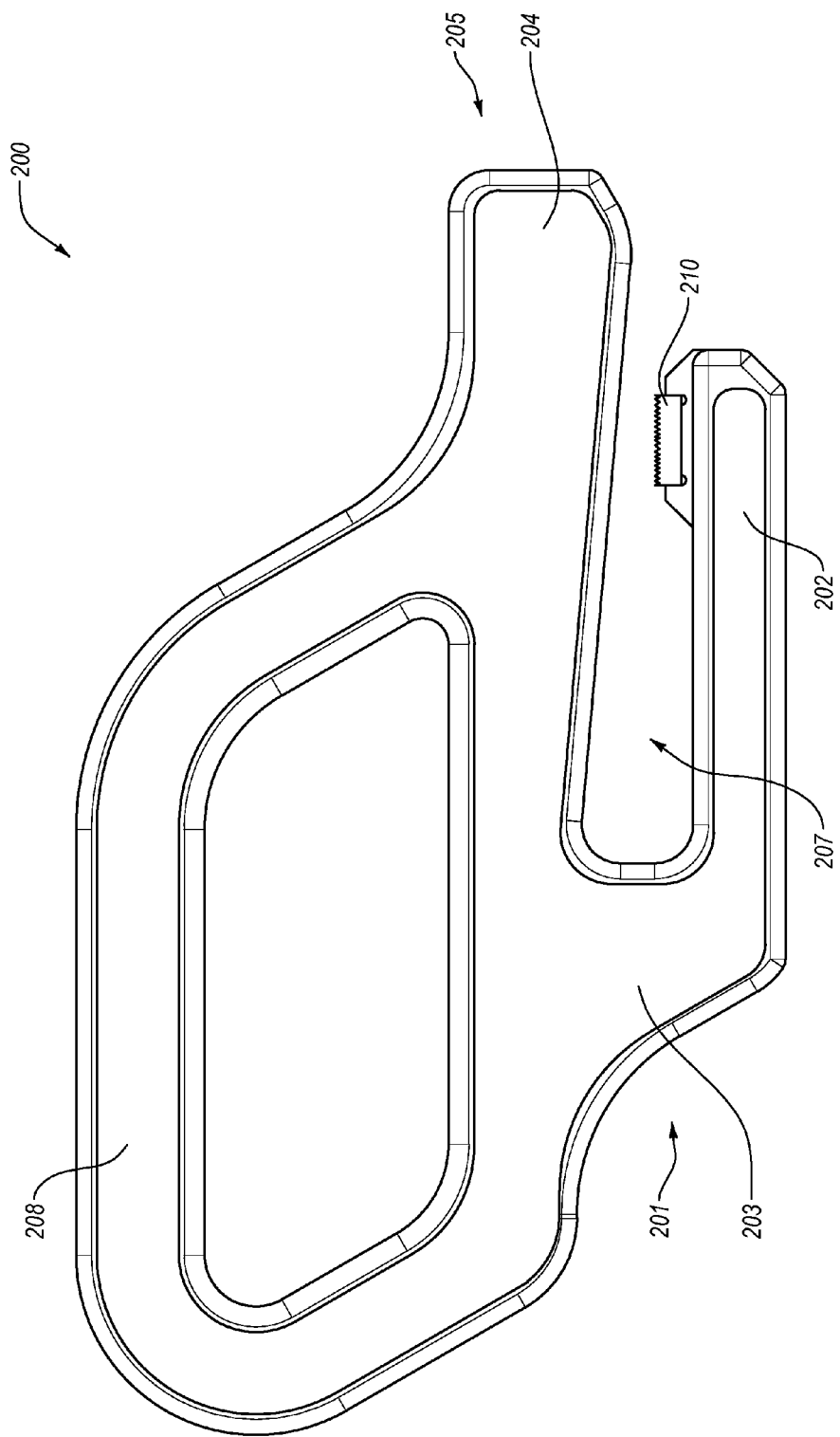
Figure 4D:
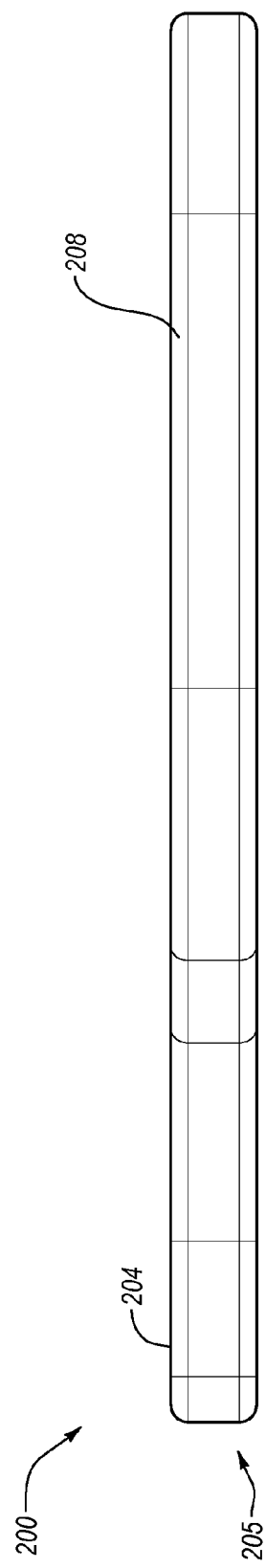
Figure 4E:
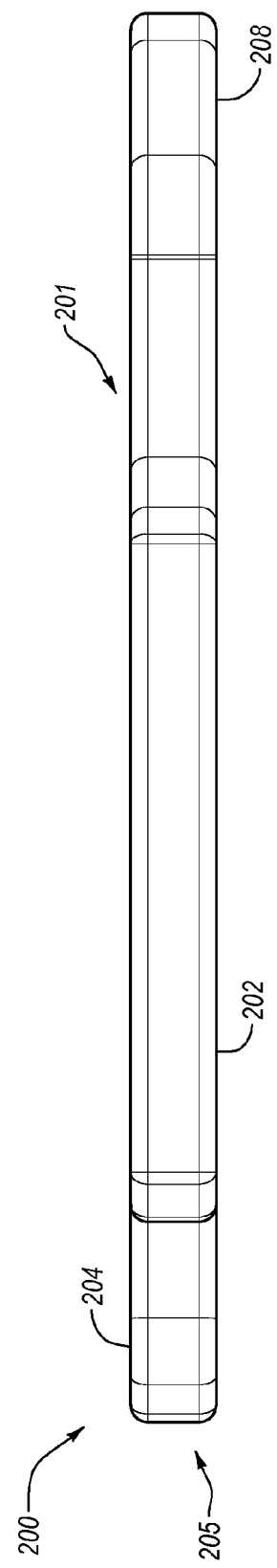
Figure 4H:
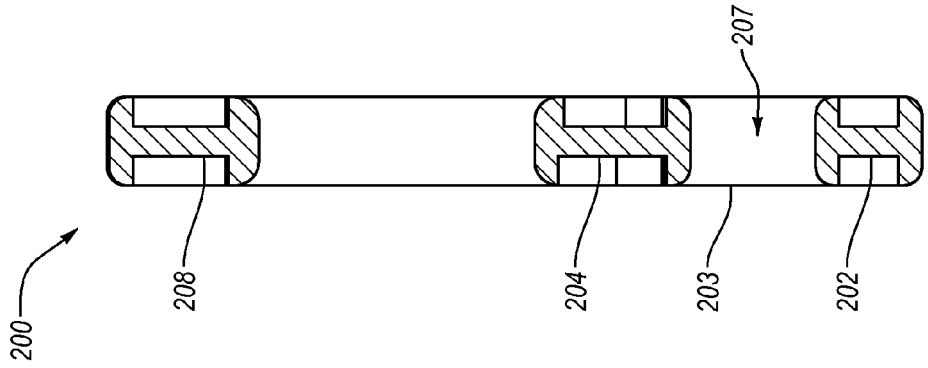
FIG. 4H illustrates a cross-sectional view of the handling and lifting device of FIG. 4A, along a section line illustrated in FIG. 4B.
Figure 4G:
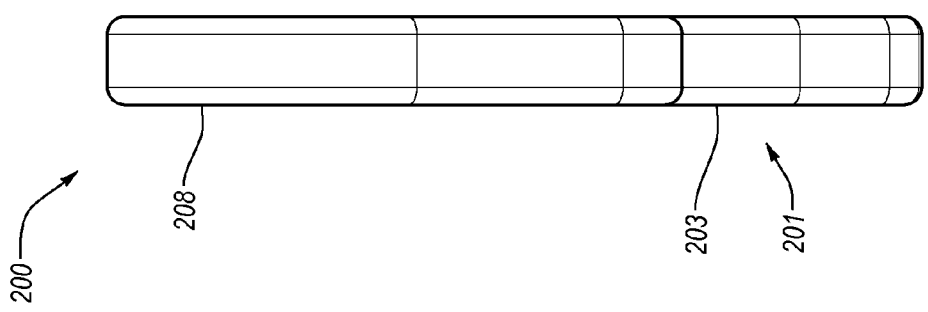
Figure 4F:
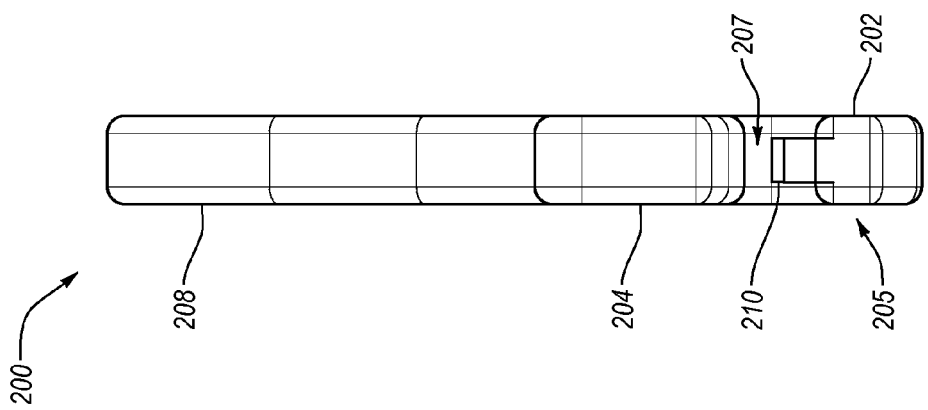

With reference to the handling and/or lifting device 200 illustrated in FIGS. 4A-4H, the handling and/or lifting device 200 may include a set of jaws 202, 204 that are offset from each other, such that a gap 207 is formed therebetween. The gap 207 may be open at a distal end 205 of the device 200. The jaws 202, 204 may each be connected to an intermediate member 203 that may be positioned at or near a proximal end 201 of the device 200, and which optionally defines an end of the gap 207. The jaws 202, 204 and the intermediate member 203 may collectively define a body having a generally C-shaped construction. Further, as best shown in FIGS. 4B, 4C, and 4H, the intermediate member 203 may be connected to the jaws 202, 204 in a manner that separates the jaws 202, 204 relative to each other.

In the embodiment illustrated in FIGS. 4A-4H, the size of the gap 207 may vary along the length of the jaws 202, 204. For instance, toward the distal end 205 of the handling and/or lifting device 200, a gripping element 210 may be connected to the lower jaw 202. The gripping element 210 can extend from an upper surface of the lower jaw 202 and towards the upper jaw 204, and be adjacent the opening of the gap 207 at the distal end 205 of the device 200. In some embodiments, the gap 207 between the upper jaw 204 and the gripping element 210 narrows at the gripping element 210. Furthermore, the jaws 202, 204 may be generally parallel to each other; however, in some embodiments there may be a slight incline of the lower jaw 202 relative to the upper jaw 204, or vice versa. In FIGS. 4B and 4C, for instance, it can be seen that the lower jaw 202 may be elongated and extend distally from the intermediate member 203 and be generally perpendicular thereto. The upper jaw 204 may, however, extend distally from the intermediate member 203, but may not be perpendicular to the intermediate member 203. For instance, the upper jaw 204 may be within about fifteen degrees of perpendicular relative to the intermediate member 203, or within about fifteen degrees of being parallel relative to the lower jaw 202. The degree of an angle may, however, vary and may be less than or greater than about fifteen degrees. In one embodiment, the upper jaw 204 and lower jaw 202 are within about three and about eight degrees of being parallel.

As best seen in FIGS. 4B and 4C, the slight angle of the upper jaw 204 relative to the lower jaw 202 can further cause the size of the gap 207 to change along a length of the lower jaw 202. The angle of inclination of the upper jaw 204 may be such that the upper jaw 204 extends distally and slopes towards the lower jaw 202. As a result, a distance of separation between the lower and upper jaws 202, 204 may decrease from the intermediate member 203 toward the distal end 205 of the handling and/or lifting device 200. Consequently, the gap 207 may be larger near the intermediate member 203, and can accommodate an increased range of angled pipes as described previously. In some embodiments, the change of size of the gap 207 may be gradual, while in other embodiments, an abrupt change in size may occur. Moreover, gradual and abrupt changes in size of the gap 207 may occur in the same device. For instance, in FIGS. 4B and 4C, the size of the gap 207 may gradually change along the length of the lower jaw 202; however, at the grip element 210, a more abrupt change in the size of the gap 207 may occur.

As also shown in FIGS. 4B and 4C and in FIG. 4H, the jaws 202, 204 may have different lengths, or have other differing characteristics. For instance, the upper jaw 204 may be longer than, or otherwise extend to a more distal position, relative to the lower jaw 203, although such is merely one example embodiment. In connection with the differing lengths of the lower and upper jaws 202, 204, contact points with a pipe or other structure coupled to the handling and/or lifting device 200 can be created by inclining the handling and/or lifting device 200 relative to a pipe or other structure. Such contact points may be longitudinally offset relative to each other as described above, or may otherwise be used to create a mechanical advantage that can secure the handling and/or lifting device 200 to a pipe or other structure and facilitate handling, lifting, or other manipulation of the structure. As shown in FIG. 4H, the cross-sectional characteristics of the upper jaw 204 may vary relative to the lower jaw 202. For instance, in this embodiment, both jaws 202, 204 have a generally I-shaped cross-sectional shape; however, the height of the upper jaw 204 may be larger than the height of the lower jaw 202. In other embodiments, the widths of jaws 202, 204, thicknesses of portions of the I-shaped cross-sections, or other characteristics may vary. In still other embodiments, for instance, one or more of the jaws 202, 204 may a cross-section other than an I-shaped configuration. For instance, one or more of the jaws 202, 204 may have a circular, square, trapezoidal, or otherwise shaped cross-section.

As further shown in FIGS. 4A-4H, a handle 208 may be attached to the jaws 202, 204. In this embodiment, the handle 208 defines a single handle with a looped configuration; however, a handle may have any other suitable configuration, including a C-shaped configuration, a T-shaped configuration, a connected strap, multiple handle elements, or any other suitable configuration. In the illustrated embodiment, the handle 208 may be integrally formed with the lower jaw 202, upper jaw 204, and/or the intermediate member 203. More particularly, in at least some aspects, the upper jaw 204 may be integral with a portion of the loop handle 208. For instance, in FIGS. 4B and 4C, the upper jaw 204 is illustrated as being integral with the handle 208, and may gradually transition into the loop handle 208. As further shown in FIG. 4H, for instance, the upper jaw 204 and the handle 208 may generally have a similar cross-sectional shape, although this isn't necessary. For instance, the upper jaw 204 and/or the handle 208 may change shape along a respective length, or otherwise have differing shapes. In other embodiments, the height of the cross-sectional shape of the upper jaw 204 may be greater than a height of all or a portion of a cross-sectional shape of the handle 208; however, the cross-sectional shapes may have substantially similar heights, widths, thicknesses, and the like, or may vary with respect to each other. The loop handle 208 may also optionally couple to, be integrally formed with, or transition into the intermediate member 203 or the lower jaw 202.

One aspect of the embodiment shown in FIGS. 4A-4H, is that manufacture of the handling and/or lifting device 200 may be simplified inasmuch as the device 200 is optionally formed as a single, integral unit. For instance, the entire handling and/or lifting device 200 may be formed from steel, aluminum, or another metal or alloy. That metal or alloy may be melted and placed in a mold that can form the handling and/or lifting device 200 with an integral construction. Example mechanisms for forming the handling and/or lifting device 200 include sand casting, shell molding, investment casting, die casting, or other molding or casting processes. Optionally, the grip element 210 may be integrally formed with the lower jaw 202 or upper jaw 204; however, in other embodiments the grip element 210 may be separately formed and thereafter attached.

Figure 5:
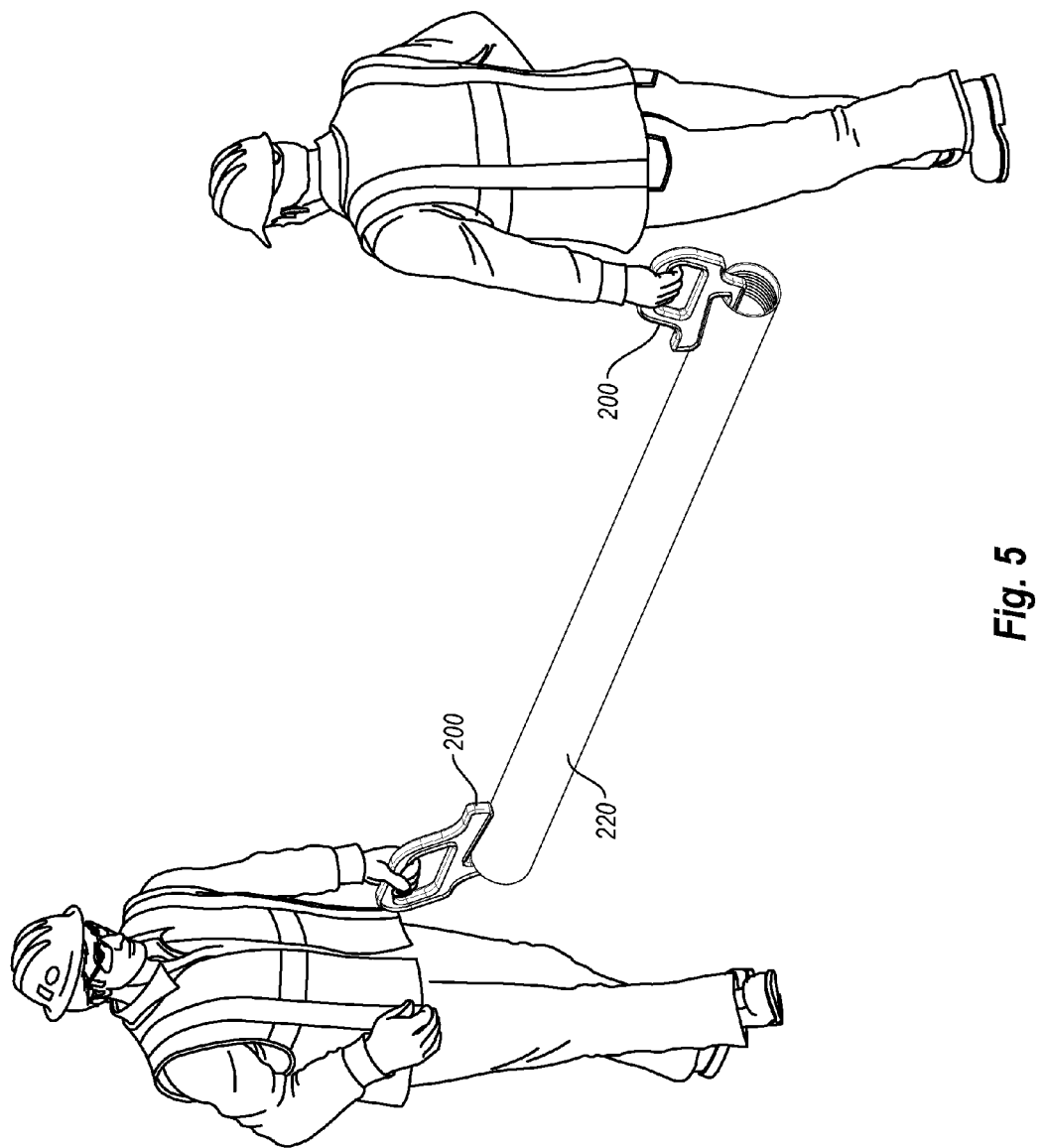
FIG. 5 illustrates a pipe being lifted by two handlers, each handler using the handling and lifting device of FIGS. 4A-4H at a respective end of the lifted pipe.

Turning now to FIG. 5, an exemplary manner in which the handling and/or lifting device 200 of FIGS. 4A and 4B may be used to handle a pipe 220 or other structure is illustrated in additional detail. In particular, in FIG. 5, two handlers or operators may be used to lift and/or move the pipe 220. For instance, the pipe 220 may be a drill rod, and the handlers may wish to move the drill rod to a location where it can be attached to a mating coupling or drill rod. The pipe 220 may have a length, size, weight, or other characteristic that makes it difficult to move using a single person.

To move the pipe 220, each handler may use a separate handling device 200. Each handling device 200 may be coupled to the pipe 220, with one at each of two opposing ends. The handlers may grasp the handling devices 200 and insert them into open ends of the pipe 220 in a manner similar to that described above. Upon insertion of the handling devices 200, or a portion thereof, into the pipe 220, the handling devices 200 can be at least partially rotated or angled relative to the pipe 220. As a result, a mechanical advantage may be created at each end of the pipe 220, and the respective handlers can grasp handles of the handling and/or lifting device 200. The handling and/or lifting device 200 can be substantially securely coupled to the pipe 220 so as to allow the handlers to move the pipe 220 in a desired and safe manner. In some embodiments, handles of the handling and/or lifting devices 200 may be configured to be about parallel to the pipe 220 when the mechanical advantage is present; however, in other embodiments the handles may be otherwise structured. For instance, as shown in FIG. 4B, an upper surface of the handles 208 may be fixed at a position that is about parallel to a lower jaw 202, although the handles 208 may additionally or alternatively be about parallel to the upper jaw 204.

While the foregoing discussion relates primarily to the handling and lifting of pipes, it should be appreciated that the principles disclosed herein can be applied to the lifting and handling of other materials and components. For example, the illustrated and described handling devices may be used with any tubular member. Moreover, the illustrated and described handling device may even be used with plates or bars. For instance, a bar or plate having a width sufficient to fit within a gap between jaws of exemplary handling and/or lifting devices may be placed therein, and the jaws may be rotated to create a mechanical advantage. The jaws may then grip the plate or bar and allow handling thereof. In some embodiments, a single handler may use two handling and/or lifting devices—one with each hand—to lift and/or handle a single end of a plate, bar, rod, pipe, or other component. Thus, the mechanical advantage described herein may also be applied to such other components to facilitate handling thereof.

The devices described herein thus provide numerous desirable features. For example, the described devices can be used to allow lifting and handling of pipes or other objects without requiring a handler to insert his or her hand inside the pipe or even on a bottom side of an object. The handler can lift and control the object with hands external to and/or above the object, thereby reducing risks of injury. Further, the mechanical advantage that may be created can be very stable. Thus, there may be a secure connection and the pipe or other object can have a reduced likelihood of inadvertently falling out of the connection with the handling device. Moreover, where threads or other features of the object are included, the connection can be placed at locations where damage to such threads or other features are minimized, if not entirely eliminated.

The foregoing discussion is intended to provide examples of suitable lifting devices and exemplary principles of operation and use. The description above is not intended to limit the scope of the claims unless otherwise expressly stated, neither are particular features intended to be identified as critical or necessary. Instead, the scope of the invention should be interpreted based on the claims which follow.

We claim:

1. A device for handling and/or lifting objects, comprising:
    a body having proximal and distal ends,
    a first jaw fixed to and extending distally from the distal end of the body;
    a second jaw fixed to and extending distally from the distal end of the body, wherein the first jaw and the second jaw are arranged to engage opposing surfaces of an object; and
    a loop handle having a first end and second end wherein the first end is fixed to the proximal end of the body and the second end is fixed to the first jaw and displaced distally from the distal end of the body, wherein the handle is configured to be controlled to create a mechanical advantage with the object when the object is positioned between the first and second jaws.

2. The device recited in claim 1, wherein the first and second jaws define a gap, the gap extending from an opening at a distal end of the first and second jaws to a termination at the distal end of the body.

3. The device recited in claim 2, wherein the gap is non-uniform.

4. The device recited in claim 2, wherein the first jaw and second jaw taper as the gap extends to a distal end of the first and second jaws.

5. The device recited in claim 1, wherein the first jaw is at a fixed position relative to the second jaw.

6. The device recited in claim 1, wherein the handle is at a fixed position relative to at least one of the first and second jaws.

7. The device recited in claim 1, wherein the second jaw has a length greater than a length of the first jaw.

8. The device recited in claim 4, wherein the first and second jaws are spaced a first distance apart between the distal ends of the first and second jaws and wherein the first and second jaws are spaced a second distance apart at the proximal ends of the first and second jaws, the second distance being greater than the first distance.

9. The device recited in claim 1, further comprising a grip mechanism at about a distal end of the second jaw.

10. The device recited in claim 9, wherein the grip mechanism includes a carbide grip element.

11. The device recited in claim 1, wherein the first and second jaws are generally parallel.

12. The device recited in claim 1, wherein the first and second jaws are inclined relative to each other.

13. A pipe lifting and handling device, comprising:
an upper engagement jaw;
an elongated lower engagement jaw, the elongated lower engagement jaw being at a fixed position relative to the upper engagement jaw;
an intermediate member connecting the upper engagement jaw to the elongated lower engagement jaw, the intermediate member being positioned at first ends of the upper engagement jaw and the elongated lower engagement jaw; and
a loop handle having a first end and second end, wherein the first end is fixed to the intermediate member and the second end is fixed to the upper engagement jaw and displaced laterally relative to the intermediate member.

14. The pipe lifting and handling device recited in claim 13, wherein the upper engagement jaw, elongated lower engagement jaw, intermediate member, and loop handle are formed as a single, integral component.

15. The pipe lifting and handling device recited in claim 13, wherein the upper engagement jaw and elongated lower engagement jaw have second ends opposite the first ends and define a gap therebetween, the gap being open at the second ends.

16. The pipe lifting and handling device recited in claim 15, wherein the gap has a width smaller at the second ends than at the first ends.

17. The pipe lifting and handling device recited in claim 13, wherein the upper engagement jaw and the lower engagement jaw have second ends opposite the first ends, and wherein the upper engagement jaw and elongated lower engagement jaw define respective contact points proximate the second ends, the contact points being configured to contact an object positioned between the upper engagement jaw and the elongated lower engagement jaw.

18. The pipe lifting and handling device recited in claim 17, wherein a contact point on the upper engagement jaw is further from the first ends than a contact point on the elongated lower engagement jaw.

19. A method for lifting and/or handling a tubular member, the method comprising:
connecting a handling device having a proximal end to a tubular member, wherein connecting the handling device includes:
inserting a first jaw of the handling device inside a lumen of the tubular member;
sliding the first jaw longitudinally within the lumen of the tubular member, wherein sliding the first jaw longitudinally includes sliding a second jaw longitudinally relative to the pipe, the second jaw being external to the tubular member; and
lifting a proximal end of the handling device, wherein lifting the proximal end of the handling device causes the second jaw to contact an exterior surface of the tubular member at a first contact point, and the first jaw to contact an interior surface of the tubular member at a second contact point, the first contact point being distally offset relative to the second contact point; and
manipulating the handling device using a loop handle having a first end and a second end, wherein the first end is fixed to a proximal end of the handling device and the second end is fixed to the second jaw and displaced distally from the proximal end of the handling device, wherein manipulating the handling device includes causing the first and second contact points to remain in substantially constant engagement with the tubular member, and at a substantially fixed location on the tubular member, during manipulation of the handling device.

20. The method recited in claim 19, wherein lifting the proximal end of the handling device includes creating a mechanical advantage between the first and second jaws of the handling device and the tubular member.

* * * * *